No. 782,737. PATENTED FEB. 14, 1905.
Q. N. EVANS.
BOILER.
APPLICATION FILED FEB. 17, 1904.

2 SHEETS—SHEET 1.

WITNESSES:
René Buine
Theodore T. Snell

INVENTOR:
Quimby N. Evans,
By Attorneys,
Arthur C. Fraser & Co.

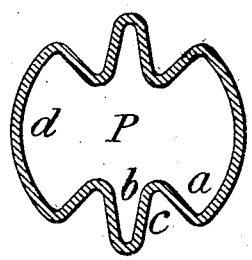
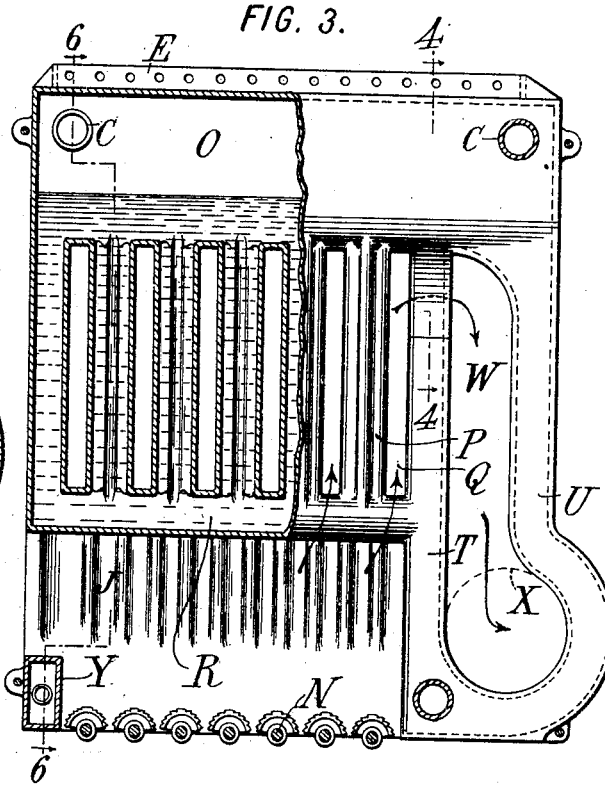
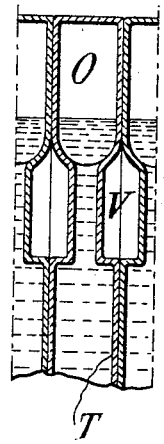
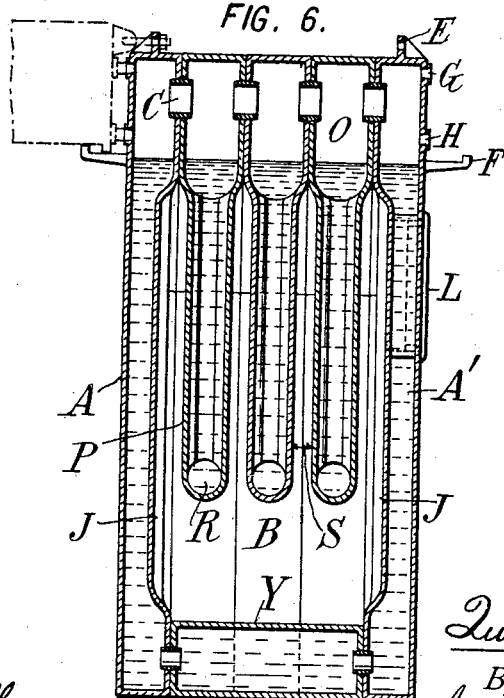

No. 782,737.                                                    Patented February 14, 1905.

UNITED STATES PATENT OFFICE.

QUIMBY N. EVANS, OF BROOKLYN, NEW YORK.

BOILER.

SPECIFICATION forming part of Letters Patent No. 782,737, dated February 14, 1905.

Original application filed December 26, 1903, Serial No. 186,722. Divided and this application filed February 17, 1904. Serial No. 194,103.

*To all whom it may concern:*

Be it known that I, QUIMBY N. EVANS, a citizen of the United States, residing in the borough of Brooklyn, county of Kings, city and State of New York, have invented certain new and useful Improvements in Boilers, of which the following is a specification.

This invention aims to provide certain improvements in boilers applicable especially to heating systems—such, for example, as that described in my application for Letters Patent of the United States, Serial No. 186,722, filed December 26, 1903, of which this application is a division.

Though termed a "boiler," and preferably used for generating steam, the invention is equally designed for the heating of water below the boiling-point.

Various improvements in the detailed construction of the boiler are provided, whereby a high efficiency is obtained and whereby especially the cost of installing is reduced to a minimum.

Various other improvements are referred to hereinafter in detail.

The accompanying drawings illustrate an embodiment of the invention.

Figure 1:
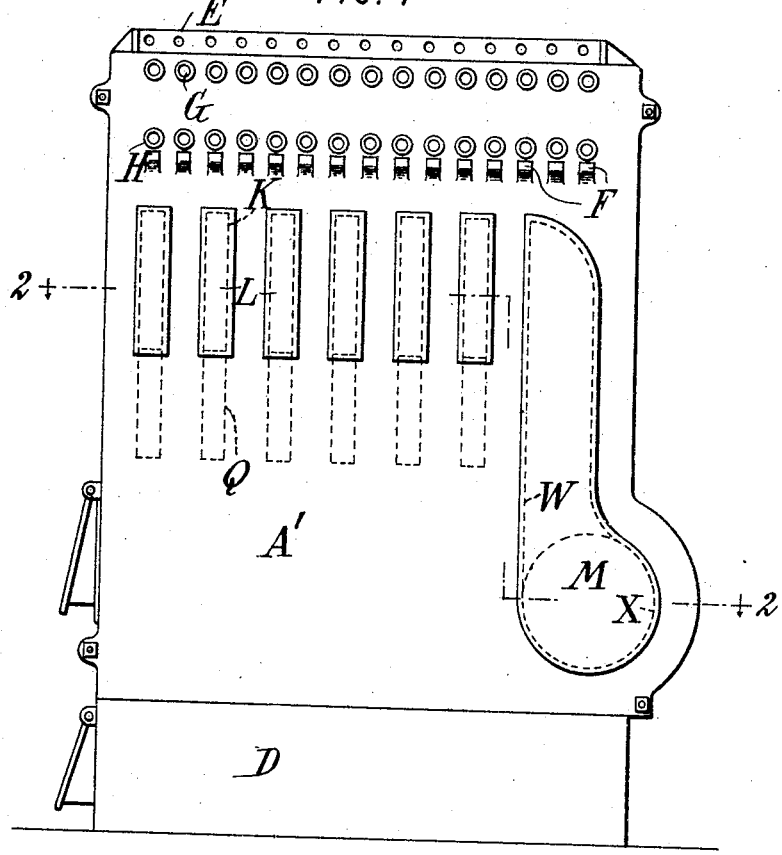
Figure 2:
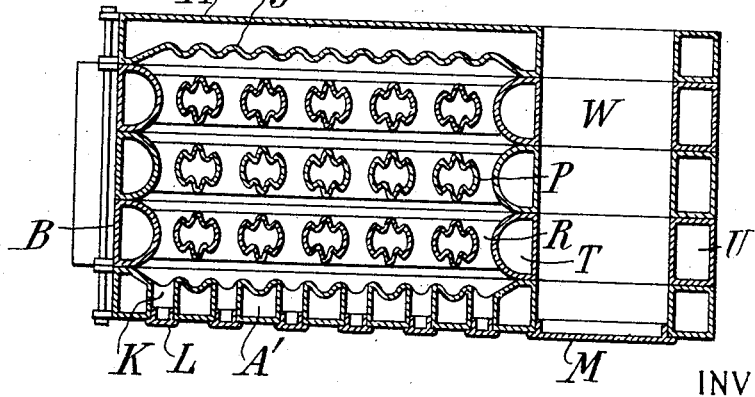

Figure 1 is a side view of a complete boiler. Fig. 2 is a horizontal section of Fig. 1 on the line 2 2. Fig. 3 is a longitudinal section showing in part a side elevation of one of the sections of the boiler. Fig. 4 is a section on the line 4 4 of Fig. 3, showing adjacent boiler-sections in position. Fig. 5 is a cross-section of one of the tubes of the boiler. Fig. 6 is a transverse section on the line 6 6 of Fig. 3.

The boiler is preferably constructed in a series of longitudinal sections united in any suitable manner. In the present case two side sections A and A' and three intermediate sections B are shown, the several sections being suitably apertured to permit their connection by means of slip or drive nipples C, which enter the registering openings and fit tightly therein by the driving or forcing of the boiler-sections together. This manner of connection is well understood in the art. When the several sections are connected together, they are placed upon an ash-pit D, Fig. 1, of any suitable construction. The two outer sections A and A' differ from the intermediate sections B in being provided with means for connection to the radiators and for communication therewith. The means for connection consist, preferably, of a rib or lug E, extending along near the outer face of each section, and a series of hooks F on the outer side of the section near the top. The manner of connecting the radiators with the ribs E and hooks F is illustrated in my original application above referred to and in dotted lines in Fig. 6. Ports G and H are also provided in the upper portion of the side wall of preferably each outer section for communication with the radiators located as described. These ports are suitable for connection by means of slip or drive nipples or by any other suitable means. The outer sections also differ from the intermediate sections internally, having a water-space extending throughout the height of the boiler and being preferably of substantially box shape, as indicated, with an internal corrugated wall J, forming a chamber of slightly less width at the intermediate portion than at the ends, where it is to be connected to the adjacent intermediate section of the boiler. The side section A' is also preferably provided with openings K, which are normally closed by means of doors L and which give access to spaces or smoke-flues extending transversely across the boiler in a manner hereinafter described. Preferably the same side section A' is provided with a larger door M, giving access to another transverse flue hereinafter described. The intermediate sections B are shorter than the side sections, so as to provide a furnace-chamber. The grate-bars N are shown to indicate their position, though they and the ash-pit form no part of the boiler-section or of this invention.

Each section is provided with an upper chamber O and with a series of vertical tubes P depending therefrom and spaced apart by transverse spaces Q, a continuous horizontal tube R being in communication with the lower end of each of said vertical tubes. The tubes P and R are of less width than that of the ends and top of the section, so that when the sections are arranged alongside of each other there are longitudinal spaces S between the tubes constituting vertical passages for the smoke and other products of combustion. The transverse passages Q between the vertical tubes also facilitate the distribution of the heated gases throughout the boiler. At the rear end of each section are a pair of tubes or water-legs T U. The legs U are of the full width of the section throughout their length, while the legs T are reduced in width at their upper ends, as indicated in Fig. 4, to form longitudinal passages V, through which the smoke passes to the final transverse passage W at the rear of the boiler. The flue or passage W extends downward to approximately the bottom of the section, being surrounded throughout its length by the water-legs T U, which are united at the bottom. The smoke is withdrawn from the lower end of the flue W, the dotted line X indicating approximately the position of the flue leading to the stack and into which the smoke is passed from the flue W. The outer sections A and A', it will be understood, extend from front to back continuously to the bottom, so as to form the sides of the furnace. They are united at the front by a tubular member Y, extending across the boiler. The doors L and M register with the transverse passages Q and W, respectively, so that the boiler can be kept entirely clean with very little trouble.

The tubes P may be of any suitable form. Preferably the shape shown in cross-section in Fig. 5 is used, the section being uniform throughout its length. The wall of the tube is so corrugated that it forms inside angles $a$ $b$ and outside angles $c$, which are quite deep, so as to give an extensive heating-surface, and which are of considerable width at their open ends, so as to facilitate the casting of the tubes and the withdrawal of the sand. Two of the opposite quadrants $d\,d$ are curved outwardly substantially in a circular arc, the intermediate quadrants being deeply corrugated in the manner explained.

The boiler will ordinarily be filled with water to about the level indicated in Figs. 3, 4, and 6. The smoke passes up between the sections in the spaces S and transversely through the spaces Q and finally through the passages V into the rear flue W. The steam from the upper part of the boiler passes into the radiators through the openings G, and after circulating therein in any suitable manner is discharged through the openings H back into the boiler.

The boiler can be extended or diminished in size by adding or taking away any number of intermediate sections. The attachment of the radiators to the outer sections facilitates this adjustability of the capacity of the system. When the boiler is used without the radiators, or with radiators communicating therewith in some other manner than that shown, the side sections A and A' may be cast without the ports G and H and without the rib E and hooks F.

The provision of a horizontal tube R, communicating with the lower ends of the vertical tubes P, insures a very good circulation of the water within the boiler. Furthermore, it avoids the dead ends which would otherwise exist and in which in previous constructions dirt has been found to accumulate in considerable quantities. With the horizontal tubes R the dirt may be very readily blown out, passing first into the long leg at the rear.

Though I have described with great particularity of detail a complete embodiment of my invention, yet it is not to be understood that the invention is limited to the particular embodiment described. Various modifications thereof in detail and in the arrangement and combination of the parts may be made by those skilled in the art without departure from the invention.

What I claim is—

1. A boiler comprising longitudinal sections having an upper chamber, a series of vertical tubes P depending below said chamber and spaced apart by transverse spaces Q, and a horizontal tube R communicating with the lower ends of said vertical tubes, said sections arranged alongside of each other and having smoke-passages S between them, and having a transverse smoke-passage W at one end extending downward below said horizontal tube, and having also water-legs T and U surrounding said transverse smoke-passage, said legs T being reduced in width at their upper ends to form longitudinal passages V between them.

2. A boiler comprising intermediate longitudinal sections B each having an upper chamber, a series of vertical tubes P depending below said chamber and spaced apart by transverse spaces Q, and a horizontal tube R communicating with the lower ends of said vertical tubes, said sections arranged alongside of each other and having smoke-passages S between them, and having a transverse smoke-passage W at one end extending downward below said horizontal tube, and having also water-legs T and U surrounding said transverse smoke-passage, said legs T being reduced in width at their upper ends to form longitudinal passages V between them; and a pair of side sections having each a water-space extending throughout the height of the boiler, and having an internal corrugated wall J forming a chamber of less width at the intermediate portion than at the ends.

3. A boiler comprising intermediate longitudinal sections B each having an upper chamber, a series of vertical tubes P depending below said chamber and spaced apart by transverse spaces Q, and a horizontal tube R communicating with the lower ends of said vertical tubes, said sections arranged alongside of each other and having smoke-passages S between them, and having a transverse smoke-passage W at one end extending downward below said horizontal tube, and having also water-legs T and U surrounding said transverse smoke-passage, said legs T being reduced in width at their upper ends to form longitudinal passages V between them; and a pair of side sections having each a water-space extending throughout the height of the boiler, and having an internal corrugated wall J forming a chamber of less width at the intermediate portion than at the ends; openings K being provided in one of said sections and giving access to said transverse spaces.

4. A cast vertical tube for boilers, formed with two opposite outwardly-curved portions $d$ and intermediate corrugated portions forming inside angles $a$ and $b$ and outside angles $c$ of considerable width at their open ends.

In witness whereof I have hereunto signed my name in the presence of two subscribing witnesses.

QUIMBY N. EVANS.

Witnesses:
   DOMINGO A. USINA,
   FRED WHITE.